United States Patent
Yamada et al.

(10) Patent No.: US 10,754,055 B2
(45) Date of Patent: Aug. 25, 2020

(54) APPARATUS AND METHOD FOR OBTAINING PETROPHYSICAL IMAGES USING ELECTRICAL IMAGER AND MULTI-FREQUENCY DISPERSION MEASUREMENTS

(71) Applicant: Schlumberger Technology Corporation, Sugar Land, TX (US)

(72) Inventors: Tetsushi Yamada, Clamart (FR); Tianhua Zhang, Clamart (FR); Ollivier Faivre, Paris (FR); Jean-Marc Donadille, Clamart (FR); Richard Bloemenkamp, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 172 days.

(21) Appl. No.: 15/788,105

(22) Filed: Oct. 19, 2017

(65) Prior Publication Data

US 2018/0120470 A1    May 3, 2018

Related U.S. Application Data

(60) Provisional application No. 62/414,059, filed on Oct. 28, 2016.

(51) Int. Cl.
*E21B 49/00* (2006.01)
*G01V 3/30* (2006.01)
(Continued)

(52) U.S. Cl.
CPC ............ *G01V 3/30* (2013.01); *E21B 47/0002* (2013.01); *E21B 47/10* (2013.01); *E21B 49/00* (2013.01)

(58) Field of Classification Search
CPC . G01V 3/30; G01V 3/20; G01V 13/00; G01V 3/18; G01V 3/26; E21B 47/0002; E21B 49/00
See application file for complete search history.

(56) References Cited

U.S. PATENT DOCUMENTS

| | | | |
|---|---|---|---|
| 5,869,968 A * | 2/1999 | Brooks | ...................... G01V 3/30 324/338 |
| 7,066,282 B2 | 6/2006 | Chen et al. | |

(Continued)

FOREIGN PATENT DOCUMENTS

| | | |
|---|---|---|
| CA | 2915086 A1 | 1/2015 |
| CN | 204009116 U | 12/2014 |

OTHER PUBLICATIONS

Stroud, Milton, De: "Analytical Model for the Dielectric Response of Brine-Saturated Rocks", American Physical Society, Physical Review B (Oct. 1986) 34, No. 8 (9 pages).

(Continued)

*Primary Examiner* — Alesa Allgood

(57) ABSTRACT

Methods and systems for determining petrophysical parameters of a formation are provided. In one embodiment, a method includes acquiring formation data with a borehole imaging tool deployed in a well penetrating a formation and acquiring additional formation data with a dielectric logging tool deployed in the well. The method also includes calibrating the formation data acquired with the borehole imaging tool based on the additional formation data acquired with the dielectric logging tool. The calibrated formation data can then be used in determining a petrophysical parameter of the formation. Additional methods, systems, and devices are also disclosed.

17 Claims, 8 Drawing Sheets

(51) Int. Cl.
*E21B 47/00* (2012.01)
*E21B 47/10* (2012.01)

(56) References Cited

U.S. PATENT DOCUMENTS

| | | | |
|---|---|---|---|
| 7,141,981 B2 | 11/2006 | Folberth et al. | |
| 2014/0347056 A1* | 11/2014 | Hayman | E21B 47/00 |
| | | | 324/355 |
| 2015/0112598 A1* | 4/2015 | Kherroubi | G01V 3/20 |
| | | | 702/11 |
| 2015/0361789 A1* | 12/2015 | Donderici | G01V 3/20 |
| | | | 367/82 |
| 2018/0059280 A1* | 3/2018 | Hartmann | G01V 3/30 |

OTHER PUBLICATIONS

Sen, Scala, Cohen, "A Self-Similar Model for Sedimentary Rocks with Application to the Dielectric Constant of Fused Glass Beads", Geophysics, vol. 46, No. 5, May 1981 p. 781-795.

* cited by examiner

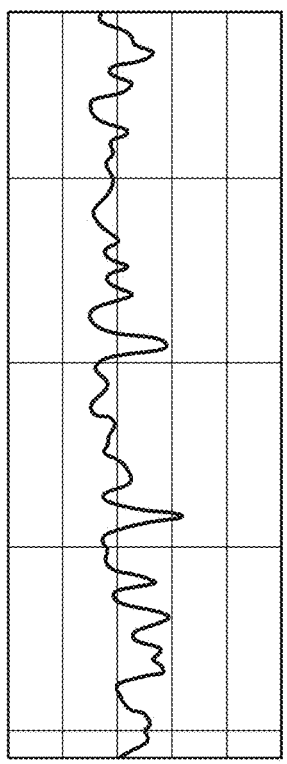
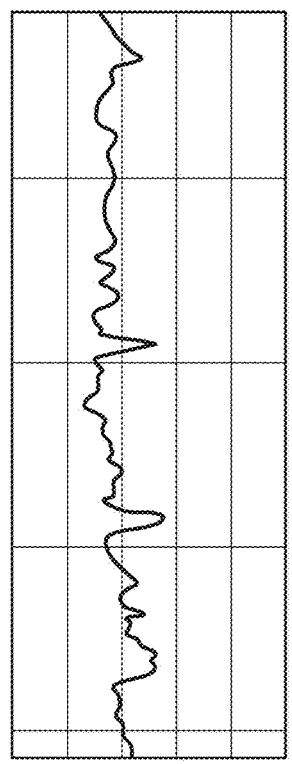
FIG. 8    FIG. 9
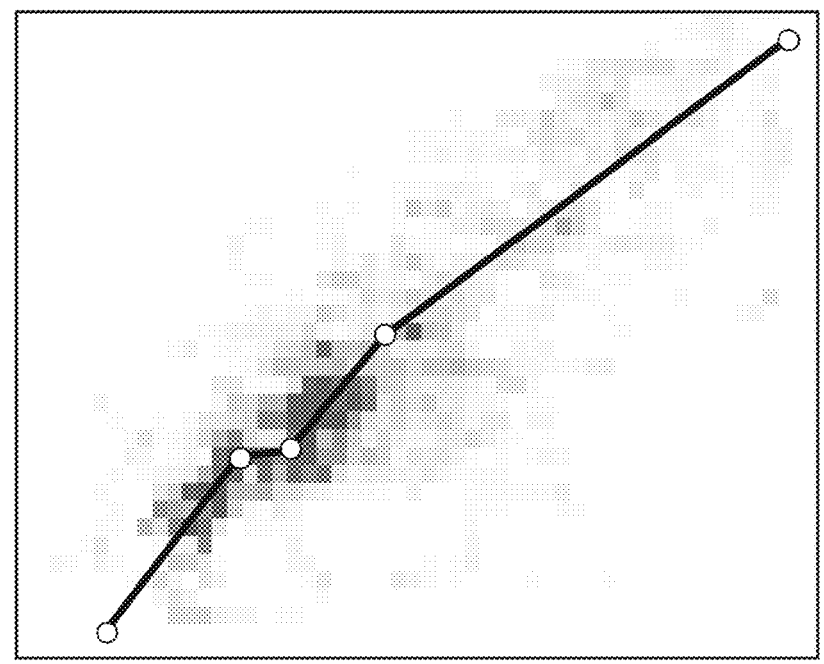
FIG. 10

APPARATUS AND METHOD FOR OBTAINING PETROPHYSICAL IMAGES USING ELECTRICAL IMAGER AND MULTI-FREQUENCY DISPERSION MEASUREMENTS

CROSS-REFERENCES TO RELATED APPLICATIONS

This application claims priority to U.S. Provisional Patent Application No. 62/414,059, filed on Oct. 28, 2016, which is incorporated in its entirety by reference herein.

BACKGROUND

Wells are generally drilled into subsurface rocks to access fluids, such as hydrocarbons, stored in subterranean formations. The formations penetrated by a well can be evaluated for various purposes, including for identifying hydrocarbon reservoirs within the formations. During drilling operations, one or more drilling tools in a drill string may be used to test or sample the formations. Following removal of the drill string, a wireline tool may also be run into the well to test or sample the formations. These drilling tools and wireline tools, as well as other wellbore tools conveyed on coiled tubing, slickline, drill pipe, casing, or other means of conveyance, are also referred to herein as "downhole tools." A downhole tool may be employed alone or in combination with other downhole tools in a downhole tool string.

The measurements taken by downhole tools may be used, for example, to determine downhole conditions or to identify characteristics of formations surrounding boreholes in which the downhole tools are deployed. Some downhole tools include sensors for measuring downhole parameters, such as temperature, pressure, viscosity, resistivity, and the like. Downhole tools can also include various imaging devices, such as micro-resistivity imagers, for generating images that visually represent formation geology. The measurements acquired via such downhole tools may be useful in assessing downhole conditions, understanding formation characteristics, and directing oilfield operations.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

As described in greater detail below, at least some embodiments of the present disclosure relate to formation analysis and derivation of petrophysical parameters of a formation surrounding a well. In one embodiment, a method includes acquiring formation data with a borehole imaging tool deployed in a well penetrating a formation and acquiring additional formation data with a dielectric logging tool deployed in the well. The method also includes calibrating the formation data acquired with the borehole imaging tool based on the additional formation data acquired with the dielectric logging tool. Additionally, the method includes determining a petrophysical parameter of the formation based on the calibrated formation data.

In another embodiment, a method includes acquiring data about a formation surrounding a borehole, the acquired data including electrical measurements of the formation obtained with a borehole imaging tool and dispersion data for the formation. The method also includes generating images of electrical parameters of the formation based on the electrical measurements obtained with the borehole imaging tool and calibrating the generated images of electrical parameters of the formation based on the acquired dispersion data for the formation. Further, the method includes creating a petrophysical image of the formation surrounding the borehole based on the calibrated images of electrical parameters of the formation.

In an additional embodiment, an apparatus includes a downhole tool string for acquiring data within a borehole. The downhole tool string includes a borehole imaging tool and a multi-frequency dielectric logging tool. The apparatus also includes an analysis system for receiving measurements acquired with the borehole imaging tool and the multi-frequency dielectric logging tool and for calibrating received measurements. The analysis system can calibrate measurements acquired via one of the borehole imaging tool or the multi-frequency dielectric logging tool based on received measurements acquired with the other of the borehole imaging tool or the multi-frequency dielectric logging tool.

Various refinements of the features noted above may exist in relation to various aspects of the present embodiments. Further features may also be incorporated in these various aspects. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein:

FIGS. 8 and 9 are graphs of permittivity curves generated via the imaging tool and the dielectric logging tool of FIG. 2 in accordance with one embodiment;

FIG. 10 is a crossplot of permittivites measured with different tools in accordance with one embodiment;

DETAILED DESCRIPTION OF SPECIFIC EMBODIMENTS

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

Various techniques have been developed for measuring downhole parameters. In some cases, techniques have been generated for determining parameters of the formations surrounding the borehole. For example, micro-resistivity measurements of borehole walls may be taken to generate images of formations surrounding the borehole. Such micro-resistivity measurements may be taken using downhole tools, such as a Fullbore Micro Imager (FMI™) or QUANTA GEO™ Imager of SCHLUMBERGER™. In one example, measurements may be taken using current injection when the borehole is filled with a conductive fluid or mud. Where a non-conductive fluid is present, such as oil-based mud (OBM) with a very high resistivity compared to that of the formation such that a thin layer of mud between a measurement electrode and the formation, high impedance is generated between the electrode and the formation. Another example mounts one or more button voltage electrodes on an insulating pad, such as is used in the Oil Base Micro Imager (OBMI™) tool of SCHLUMBERGER™.

The present disclosure generally relates to analyzing formations with downhole tools. More particularly, at least some embodiments relate to techniques for deriving a petrophysical image of a formation surrounding a borehole from a high-frequency imager and multi-frequency permittivity and conductivity dispersion measurement. The dispersion measurement can be obtained with a dielectric logging tool (e.g., the Dielectric Scanner of SCHLUMBERGER™), through laboratory analysis (e.g., special core analysis (SCAL) measurement), or in any other suitable manner. As described in greater detail below, in one embodiment a method includes calibrating permittivity and conductivity images from the high-frequency imager using multi-frequency dispersion measurements. The calibrated images are then used together with petrophysical parameters obtained from multi-frequency dielectric measurements in an image inversion procedure using dielectric textural models to yield a petrophysical image surrounding the borehole.

Figure 1:
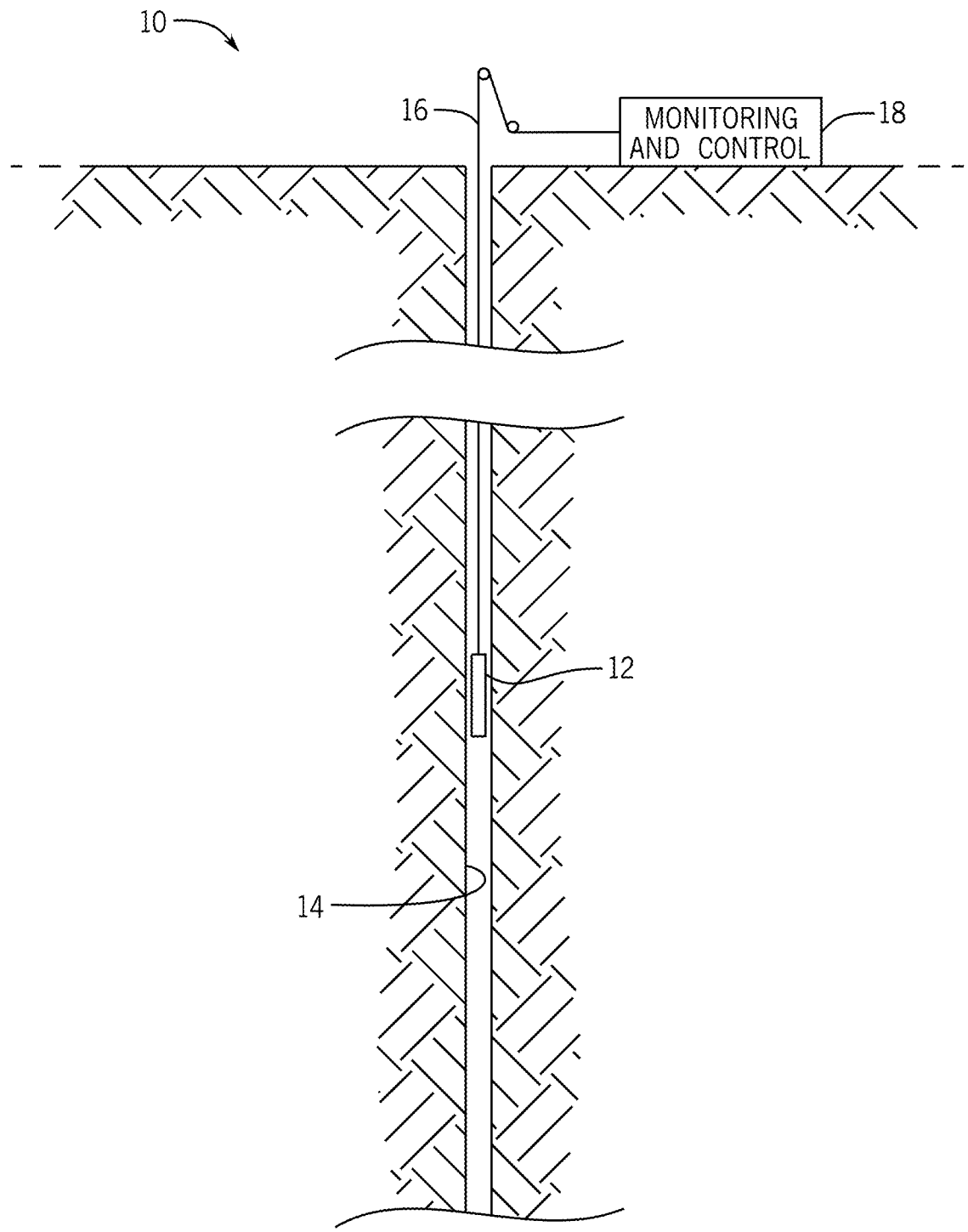
FIG. 1 generally depicts a downhole tool string deployed within a well on a wireline in accordance with one embodiment of the present disclosure.

Turning now to the drawings, an apparatus 10 for measuring downhole parameters in a well is depicted in FIG. 1 in accordance with one embodiment. In this depicted embodiment, a downhole tool string 12 is suspended in a well 14 on a cable 16. The cable 16 may be a wireline cable with at least one conductor that enables data transmission between the downhole tool string 12 and a monitoring and control system 18. The cable 16 may be raised and lowered within the well 14 (which may also be referred to as a borehole) in any suitable manner. For instance, the cable 16 can be reeled from a drum in a service truck, which may be a logging truck having the monitoring and control system 18. Although the downhole tool string 12 is depicted in FIG. 1 as being deployed via a cable, the downhole tool string 12 could be deployed within the well 14 in any other suitable manner. Further, while the apparatus 10 is shown in FIG. 1 at an onshore well 14, it will be appreciated that the apparatus 10 could be used with an offshore well in full accordance with the present techniques.

The monitoring and control system 18 controls movement of the downhole tool string 12 within the well 14 and receives data from the downhole tool string 12. The monitoring and control system 18 can include one or more computer systems or devices. The system 18 can receive data from the downhole tool string 12, and this data can be stored, communicated to an operator, or processed. Although generally depicted in FIG. 1 at a wellsite, it is noted that the system 18 could be positioned elsewhere, and that the system 18 could be a distributed system with elements provided at different places near or remote from the well 14. For example, a local component of the system 18 may be located at the wellsite for controlling operation of the downhole tool string 12 and receiving data from the tool string 12, but the received data could be processed by a different portion of the system 18 at another location.

Figure 2:
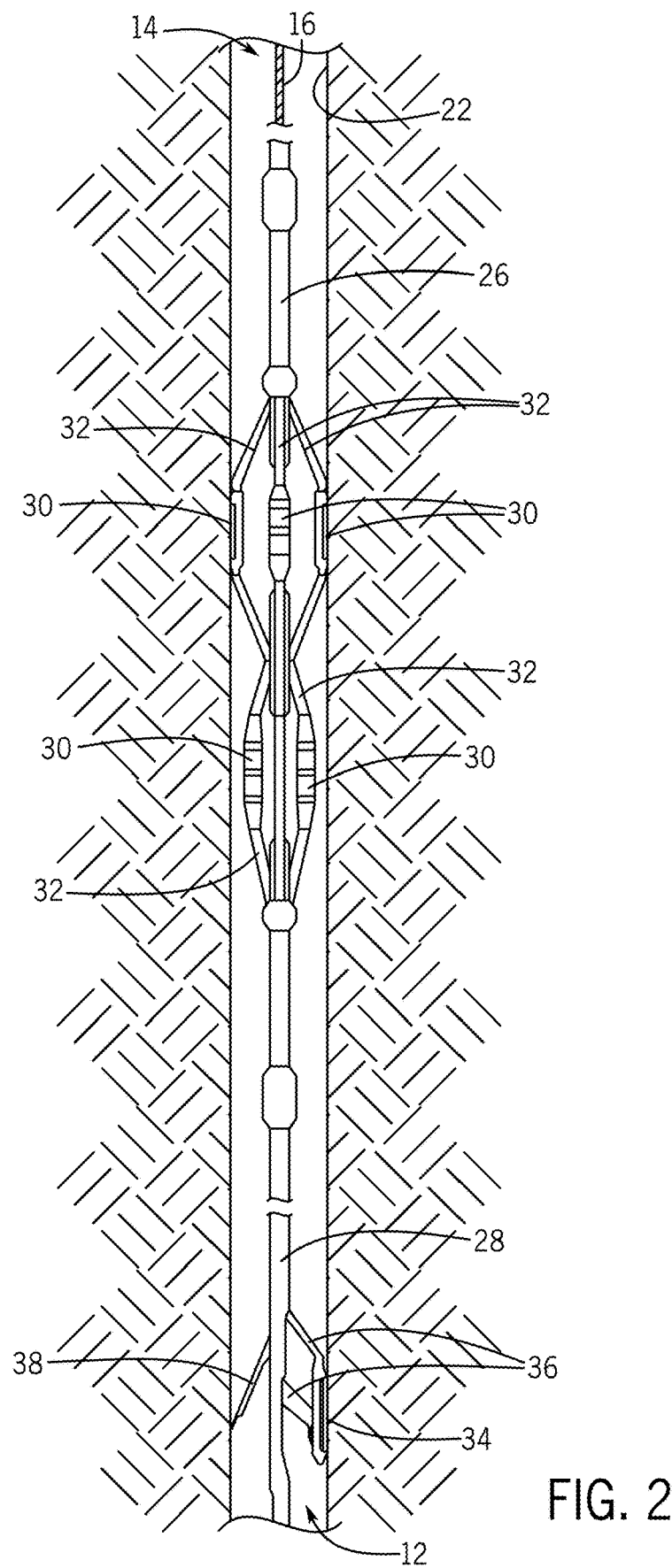
FIG. 2 represents the downhole tool string of FIG. 1 as having a borehole imaging tool and a dielectric logging tool in accordance with one embodiment.

The downhole tool string 12 can take various forms, one example of which is shown in FIG. 2. In this depicted embodiment, the downhole tool string 12 is deployed within a well 14 (having a borehole wall 22) and includes a borehole imaging tool 26 and a dielectric logging tool 28 for analyzing the formation surrounding the well 14. In at least some cases, the borehole imaging tool 26 is a high-frequency imager (HFI) in the form of a wireline micro-electrical borehole imaging tool (e.g., the QUANTA GEO™ Imager noted above) and the dielectric logging tool 28 is a multi-frequency dielectric logging tool (e.g., the Dielectric Scanner also noted above).

As further discussed herein, in some embodiments permittivity and conductivity images from a high-frequency imager (HFI) are calibrated to one-directional multi-frequency permittivity and conductivity dispersion measurement. This type of dispersion measurement, which can be measured in situ with the dielectric logging tool 28 or in a laboratory using core plugs, is denoted below as DS or DS measurement. The resulting calibrated images can be used for deriving a petrophysical image surrounding the borehole and for doing two-dimensional (2D) rock textural analysis using dielectric models.

The imaging tool 26 may use two or more high frequencies (i.e., frequencies in the MHz range) to measure the formation property in oil-based-mud (OBM). The tool 26 can have any suitable configuration, but in one embodiment includes eight sensing pads 30 that extend outwardly toward the borehole wall 22 via arms 32. The sensing pads 30 can include electrodes that facilitate formation property measurement. In one embodiment, each pad 30 includes twenty-four measuring electrodes, though other numbers of electrodes could be used in different embodiments. The HFI measures the phase angle and the amplitude of the total impedance at its frequencies (e.g., FI1, FI2, . . . ). Although the HFI may operate at just two frequencies (FI1 and FI2), in other embodiments the HFI can use some other number of frequencies.

As will be appreciated, quantified images can be derived from the HFI raw measurements through a mathematical inversion. Those images can include permittivity, conductivity, and standoff images. The equivalent formation properties, i.e., permittivity and conductivity, at multiple different frequencies of electromagnetic waves (e.g., FD1, FD2, FD3, FD4, . . . ) are also obtained with the dielectric logging tool 28 or through laboratory analysis. In at least some cases, the imaging tool 26 detects a first set of frequencies of electromagnetic waves (e.g., FI1, FI2, . . . ) that is different from a second set of frequencies (e.g., FD1, FD2, FD3, FD4, . . . ) detected by the dielectric logging tool 28 or in a laboratory for dispersion measurement.

In the embodiment depicted in FIG. 2, the dielectric logging tool 28 includes a sensing pad 34 that extends via arms 36 toward the borehole wall 22 and a biasing arm 38 that facilitates engagement of the sensing pad 34 against the borehole wall 22. Dispersion models can provide various petrophysical parameters that may be used for the petrophysical formation evaluation, such as water filled porosity ($\varphi w$), water salinity ($C_w$), and different texture parameters (e.g., cementation factor (m) and saturation exponent (n) in Archie's equation). In at least some instances of the present techniques, the permittivity and conductivity images from the HFI are calibrated to the same property from DS and then used to obtain the borehole images of such petrophysical parameters.

Data acquired with the imaging tool 26 and the dielectric logging tool 28 can be communicated (e.g., in real time) to the monitoring and control system 18 via the wireline cable 16 in at least some embodiments. The data could also or instead be stored in a local memory device of the imaging tool 26, the dielectric logging tool 28, or another component of the tool string 12 for later collection. Also, while both the imaging tool 26 and the dielectric logging tool 28 are depicted in FIG. 2 as separate tools incorporated together as part of the tool string 12, other configurations are also envisaged. In other embodiments, for instance, the imaging tool 26 can be used during a logging run to acquire formation data (e.g., conductivity and permittivity images) without including the dielectric logging tool 28 in the same tool string 12. The dispersion measurements in such cases can be acquired with the dielectric logging tool 28 in a separate logging run (with or without the imaging tool 26) or through laboratory analysis.

Figure 3:
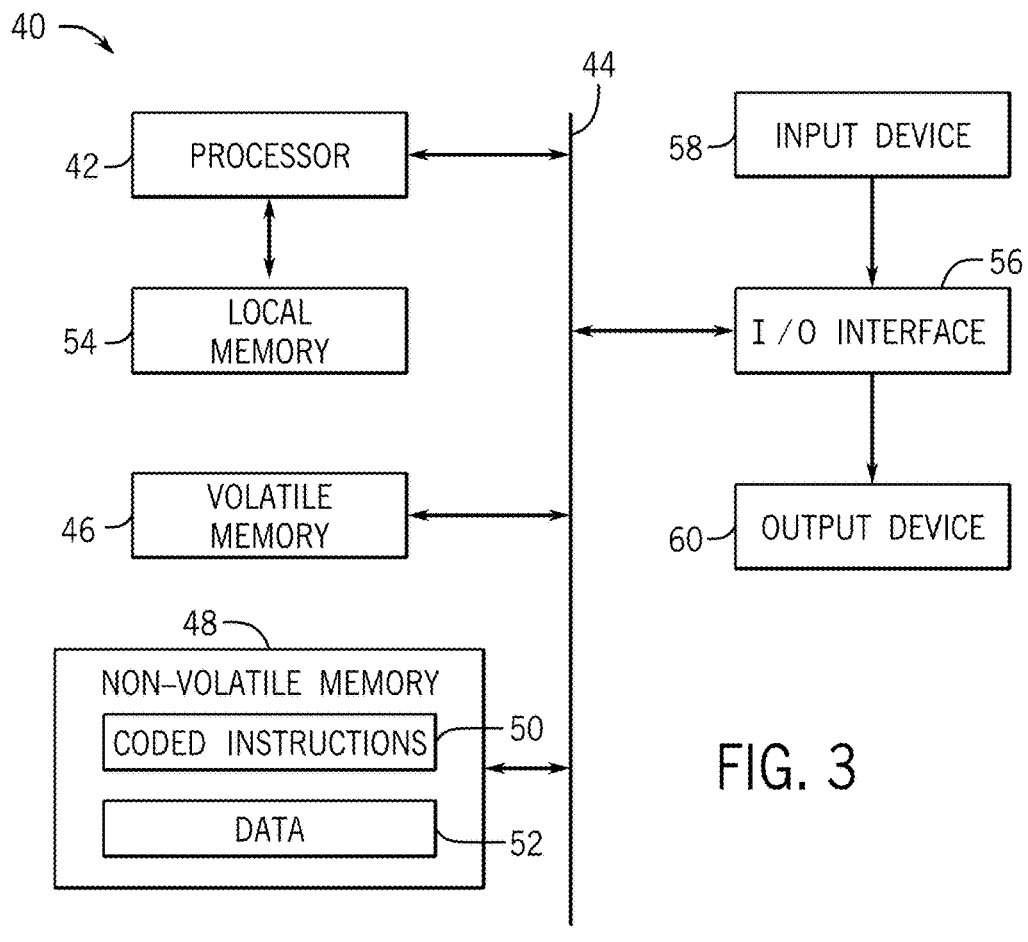
FIG. 3 is a block diagram of components of a processor-based system that can be used to perform certain monitoring or control operations, such as analysis of data acquired via the tool string of FIG. 2, in accordance with one embodiment.

The control and monitoring system 18 may be provided as a processor-based system, an example of which is depicted in FIG. 3. As presently shown, the processor-based system 40 includes at least one processor 42 connected by a bus 44 to volatile memory 46 (e.g., random-access memory) and non-volatile memory 48 (e.g., flash memory). Coded application instructions 50 and data 52 are stored in the non-volatile memory 48. The instructions 50 and the data 52 may also be loaded into the volatile memory 46 (or in a local memory 54 of the processor) as desired, such as to reduce latency and increase operating efficiency of the system 40. The coded application instructions 50 can be provided as software that may be executed by the processor 42 to enable various functionalities described herein, including analysis of data acquired via the imaging tool 26 and dielectric logging tool 28, calibration of data from one tool based on data from the other tool (e.g., calibration of images from the imaging tool 26 based on dispersion measurements), and determination of petrophysical parameters based on the calibrated data. As such, the system 18 may also be referred to as an analysis system. In at least some embodiments, the application instructions 50 are encoded in a non-transitory, computer-readable storage medium, such as the volatile memory 46, the non-volatile memory 48, the local memory 54, or a portable storage device (e.g., a flash drive or a compact disc).

An interface 56 of the system 40 enables communication between the processor 42 and various input devices 58 and output devices 60. The interface 56 can include any suitable device that enables such communication, such as a modem or a serial port. In some embodiments, the input devices 58 include one or more sensing components of the downhole tool string 12 (e.g., sensors of tools 26 and 28) and the output devices 60 include displays, printers, and storage devices that allow output of data received or generated by the system 40.

Figure 4:
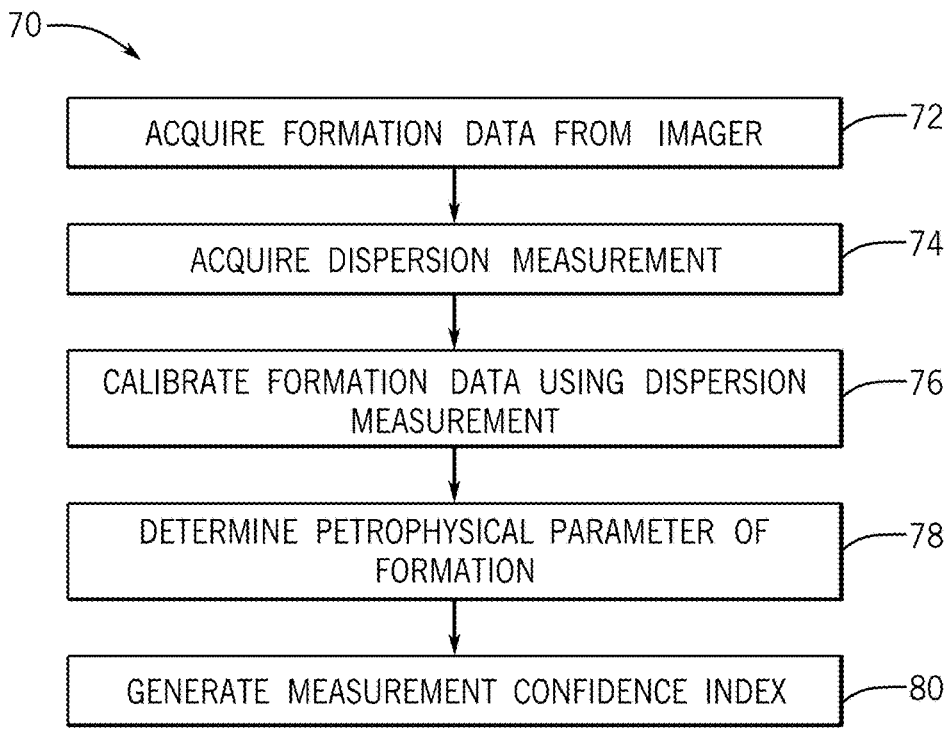
FIG. 4 is a flowchart representing a process for deriving a petrophysical parameter of a formation surrounding a well in accordance with one embodiment.

By way of example, in some cases the analysis system 18 performs a method generally represented by flowchart 70 of FIG. 4. In this embodiment, formation data is acquired with the imaging tool 26 (block 72). This data can include, for instance, measurements of electromagnetic signals emitted into and then received from the formation by the imaging tool 26, as well as images produced from such measurements. The method also includes acquiring a dispersion measurement (block 74), such as with the dielectric logging tool 28 or through laboratory analysis. As described in further detail below, the formation data acquired with the imaging tool 26 is calibrated using the dispersion measurement (block 76), and the formation data calibrated in this manner is then used to determine at least one petrophysical parameter for the formation (block 78). In other embodiments, the data acquired with the imaging tool 26 can also or instead be used to calibrate data acquired with the dielectric logging tool 28. In some cases, a measurement confidence index for measurements acquired with one of the tools (e.g., the dielectric logging tool 28) may also be generated (block 80).

More specifically, some embodiments of the present technique include preparing and calibrating HFI and DS data. Such preparation may include, for example, bridging differences between the outputs from HFI inversion and DS, such as differences in frequency, resolution and data format, and depth. For the frequency difference, the permittivity and conductivity curves at the frequencies of HFI are reconstructed from DS in at least some embodiments. For the difference in resolution and data format, the image values of HFI can be averaged over a vertical sliding window or filtered in some other manner. For the depth difference, depth shifts between the HFI and DS data can be manually or automatically corrected. For calibration, linear functions can be used for the data projection. In at least some embodiments, these linear functions are determined, for each property, in the crossplot of the curve from the image of HFI and the reconstructed curve from DS. Then, the HFI permittivity and conductivity images are calibrated to the reconstructed permittivity and conductivity, respectively, from DS. The calibrated HFI permittivity and conductivity images may then be used, together with petrophysical parameters obtained from multi-frequency measurements. In one embodiment, for example, an inversion procedure is completed pixel-by-pixel on the HFI permittivity and conductivity images. A forward model may be used in the inversion, such as a textural model used for interpreting multi-frequency dielectric measurements. In order to provide stability to the inversion procedure, one or several petrophysical quantities that are not expected to vary azimuthally can be fixed to the value found by the standard analysis of multi-frequency dielectric measurements.

Figure 5:
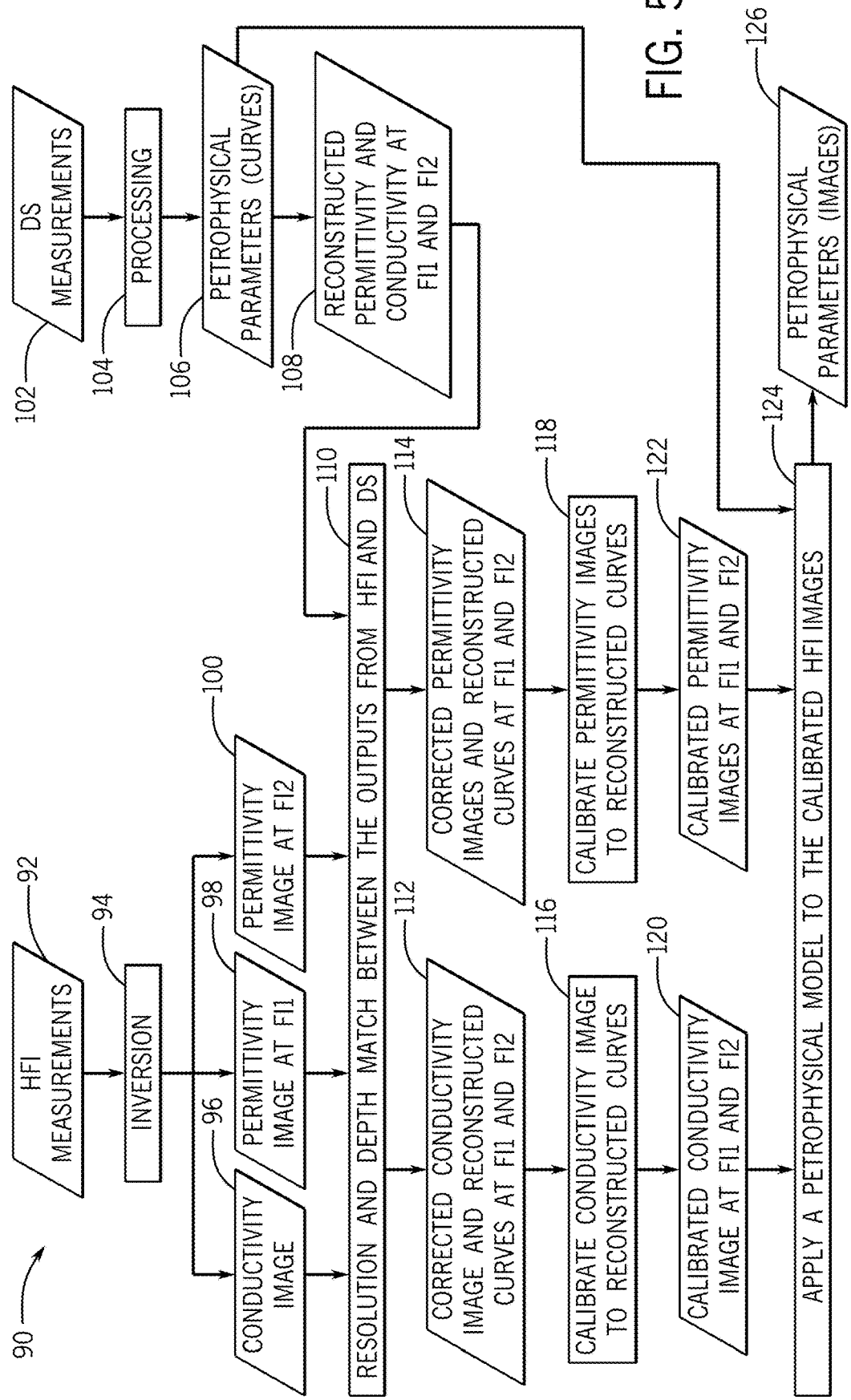
FIG. 5 is a flowchart representing a process using dispersion measurements for calibrating images acquired with an imaging tool and then using the calibrated images to determine petrophysical parameters of a formation in accordance with one embodiment.

Additional details are provided below with reference to FIG. 5, in which flowchart 90 generally represents a method for calibrating HFI images based on dispersion measurements and then using the calibrated HFI images to determine petrophysical parameters for a formation surrounding a borehole. As depicted in FIG. 5, the method includes performing inversion (block 94) on HFI measurements 92 (e.g., measurements acquired with imaging tool 26) to generate a conductivity image 96, a first permittivity image 98 (at frequency FI1), and a second permittivity image 100 (at frequency FI2). DS measurements 102 (e.g., measurements acquired with dielectric logging tool 28) may be processed (block 104) to determine petrophysical parameters 106, such as permittivity and conductivity curves.

Figure 6:
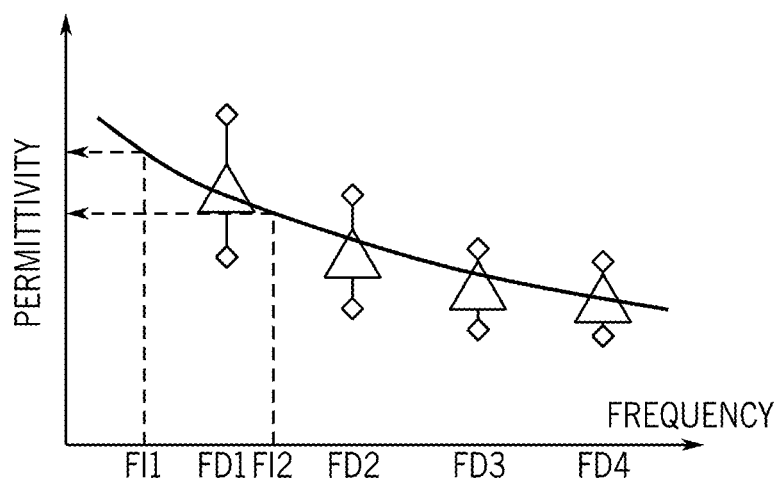
FIGS. 6 and 7 are graphs showing values of permittivity and conductivity at different frequencies due to dielectric dispersion in accordance with one embodiment.
Figure 7:
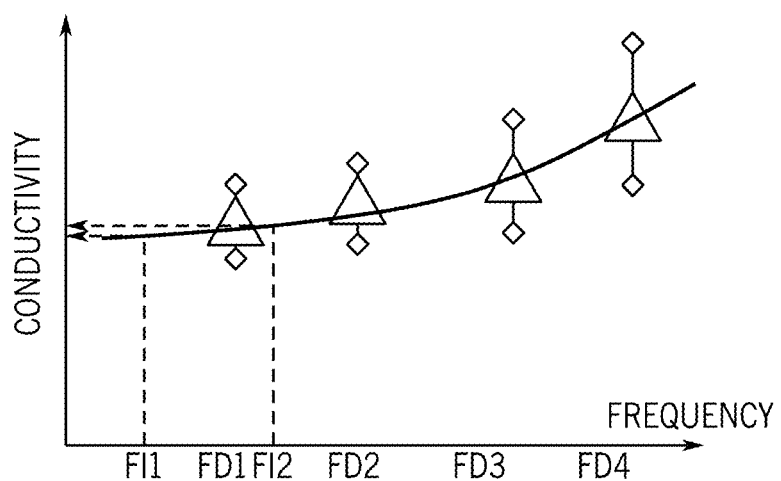

The HFI inversion and the DS processing may be made separately from each tool measurement. For the HFI and DS to be comparable with each other, differences between the outputs from HFI inversion and DS can be bridged. For example, in one embodiment, these differences include differences in frequency, resolution and data format, and depth. With respect to the first of these differences, the frequencies used in HFI may not the same as the ones used in DS. In at least one embodiment, for example, the order of frequency (by increasing magnitude) is FI1, FD1, FI2, FD2, FD3, and FD4. Accordingly, permittivity and conductivity curves of DS at the two frequencies of HFI (i.e., FI1 and FI2) can be reconstructed. FIGS. 6 and 7 are graphs showing values of permittivity and conductivity at different frequencies due to dielectric dispersion. First, a fitting curve may be obtained by fitting a dispersion model to the four dispersion points at each depth level. Once this fitting curve is obtained, the permittivity and conductivity values at the HFI frequencies can be retrieved. In this way, a total of four curves 108 can be reconstructed: permittivity and conductivity curves for each of FI1 and FI2.

The method represented in FIG. 5 also includes matching resolution and depth between the outputs from HFI and DS (block 110). In at least some embodiments, DS generally has a different vertical resolution than HFI and the output format of DS is a curve. The HFI permittivity and conductivity can be averaged over the same interval, for instance, in order to have a comparable calibration. This averaging is made over the vertical resolution of the DS, such as by averaging the image values of HFI over a vertical sliding window sized based on the vertical resolution of the DS. A simple averaging may work well in some cases (e.g., for a homogeneous formation), but other suitable techniques (e.g., median value extraction) for resolution matching may also or instead be used. Examples of HFI and DS permittivity curves are depicted in FIGS. 8 and 9 in accordance with one embodiment. The HFI permittivity curve may be generated from an HFI permittivity image. Mismatches in well depth between DS curves and HFI curves can be manually or automatically corrected in any suitable manner.

At the end of the preprocessing described above, along with a corrected conductivity image and corrected permittivity images, there are three curves from HFI (one permittivity curve at FI1, one permittivity curve at FI2, and a conductivity curve for both FI1 and FI2), four curves from DS (two permittivity curves and two conductivity curves, with one of each at FI1 and one of each at FI2). These are generally represented in FIG. 5 by data block 112 (conductivity image and curves) and data block 114 (permittivity images and curves). In the method generally represented in FIG. 5, the inverted permittivity images of HFI at each of FI1 and FI2 are calibrated (block 118) to the reconstructed DS permittivity at FI1 and FI2, respectively, and the inverted HFI conductivity is also calibrated (block 116) to the DS conductivity, to generate calibrated permittivity images 122 at FI1 and at FI2 and a calibrated conductivity image 120 for both FI1 and FI2. As HFI conductivity is for both HF1 and HF2, the average of DS reconstructed conductivity curves at FI1 and FI2 may be used.

Although non-linear functions could also or instead be used, in at least some embodiments the calibration uses linear functions. It can be assumed that the model permittivity is a function of the measured permittivity and that, by finding a and b in the equation below, the measured permittivity can be calibrated.

$$\varepsilon_{mod\_el} = \varepsilon_{HFI\_Meas.} \times a + b = \varepsilon_{HFI\_calib.}$$

In at least one embodiment, it can be further assumed that the permittivity from DS is the model permittivity because the calibrated HFI permittivity image will be eventually integrated into the dispersion model together with the DS outputs.

$$\varepsilon_{mod\_el} = \varepsilon_{DS\_Recons.}$$

Figure 11:
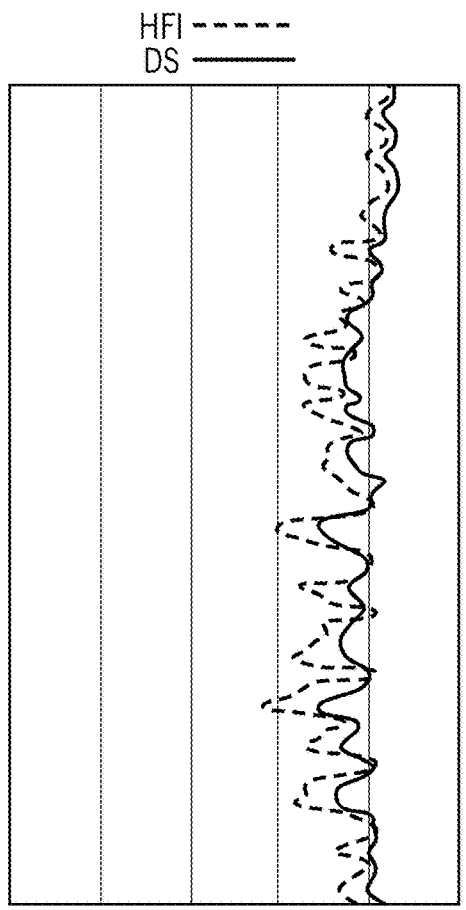
FIGS. 11 and 12 are graphs comparing uncalibrated and calibrated imaging tool measurements with dielectric logging tool measurements in accordance with one embodiment.
Figure 12:
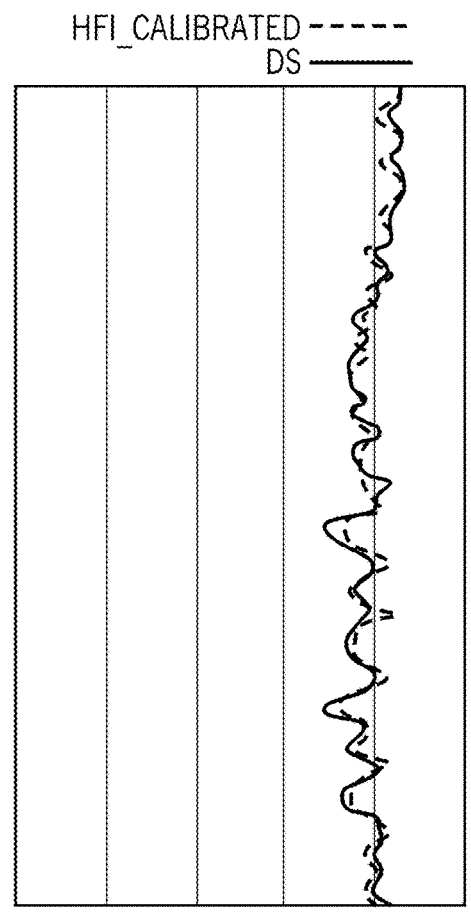

The data from the HFI curve and the DS curve are plotted in a crossplot, and pairs of a and b can be determined for different data value ranges by fitting lines to the high-density area in the crossplot. One example of such a crossplot is generally depicted in FIG. 10. Once the pairs of a and b are obtained, the image values of HFI can be projected to the reconstructed DS for the calibration. An example of the calibration result is generally shown in FIGS. 11 and 12, with the calibrated HFI result in FIG. 12 showing a closer match to DS than the uncalibrated HFI values represented in FIG. 11.

The three calibrated permittivity and conductivity images 120 and 122 from HFI can then be used in an inversion (block 124). In at least one embodiment, the inversion runs pixel-by-pixel on the images to produce images of one or more petrophysical quantities 126 surrounding the borehole. For each pixel, up to three measurements can be used in the inversion: the two calibrated permittivities and the calibrated conductivity of the HFI. The forward petrophysical model used in the inversion may be a dielectric textural model, such as the ones used in multi-frequency dielectric interpretation (e.g., SMD, bimodal, SHSD, SDR06, and Venezuela models). The inversion of these models generally yields three to four petrophysical quantities: the water-filled porosity ($\varphi_w$), the water salinity ($Sal_w$), and one or two textural parameters, including the water-phase tortuosity (MN).

As not as many measurements are available for the image inversion compared to standard processing of the DS, some of these quantities can be fixed in the image inversion for stability purposes. In some embodiments of this inversion, the water salinity and possibly the second textural parameter are fixed to the values computed in the DS processing. The inversion then solves for images of porosity $\varphi_w$ and MN. Similarly to the standard processing of DS, the low-frequency limit of the reconstructed conductivity dispersion may provide the direct current (DC) conductivity. This allows generation of an image of the DC resistivity $R_{x0}$ of a flushed zone of the formation surrounding the well.

The water-filled porosity distribution surrounding the borehole circumference can indicate the heterogeneity of the pore water. Because of the azimuthal coverage, it can also indicate the direction of potential water coming to the well (e.g., for evaluation of whether water injected into a nearby injection well reaches a destination well). In the case of oil-based mud, the water-filled porosity is often the volume of irreducible water. The water salinity and water-phase tortuosity may facilitate an accurate evaluation of the reservoir water saturation. In the past, water salinity and water-phase tortuosity were derived from downhole reservoir rock sampling or core plugging followed by core plug measurements at a laboratory. These measurements were generally costly and provided measurements for these parameters at just discrete points in the well. In contrast, the present techniques can be used to map the distribution of these reservoir properties in the borehole image format with a high azimuthal and vertical resolution.

In some embodiments, HFI output is used for quality control for DS measurement by dielectric logging tool 28. Borehole images generally contain useful geological information about the drilling mud, the formation surrounding the borehole, and about the state of the borehole wall 22. This information may include location, orientation, and density of fractures and faults, as well as information about rock lamination and orientation, including fine-scale layering that may be beyond the spatial resolution of the dielectric logging tool 28. Borehole images may show mud heterogeneity, which may include mud cake and debris and may show its orientation dependence. Some HFI imagers may give a high spatial resolution standoff-rugosity image of the borehole wall. Such an image gives the distance between a sensor and the rock as a high-resolution image allowing (with caliper information, for example) derivation of a rugosity index or a detailed borehole shape for the well. Orientation information of the rock may also be used to derive an anisotropy index of the rock.

This various information can be used as extra log quality control for the dielectric measurement. In one implementation, for example, a DS measurement confidence index can be generated, which can be based on one or more (e.g., several) of the imager-derived parameters described above. One technique for deriving the quality of the DS measurement for some logging interval may include: (1) determining, such as by using an inclinometry tool, the direction and depth that the DS tool is facing; (2) selecting the borehole imager data for a small depth interval and orientation interval around that depth and orientation; (3) determining a rugosity parameter (e.g., a total variation measure of the standoff-rugosity output of the imager) on that patch; (4) determining a lamination index and orientation on that patch; (5) determining various other desired indices, if any; and (6) assigning a combined index as a confidence measure in the measurement of the DS tool.

Figure 13:
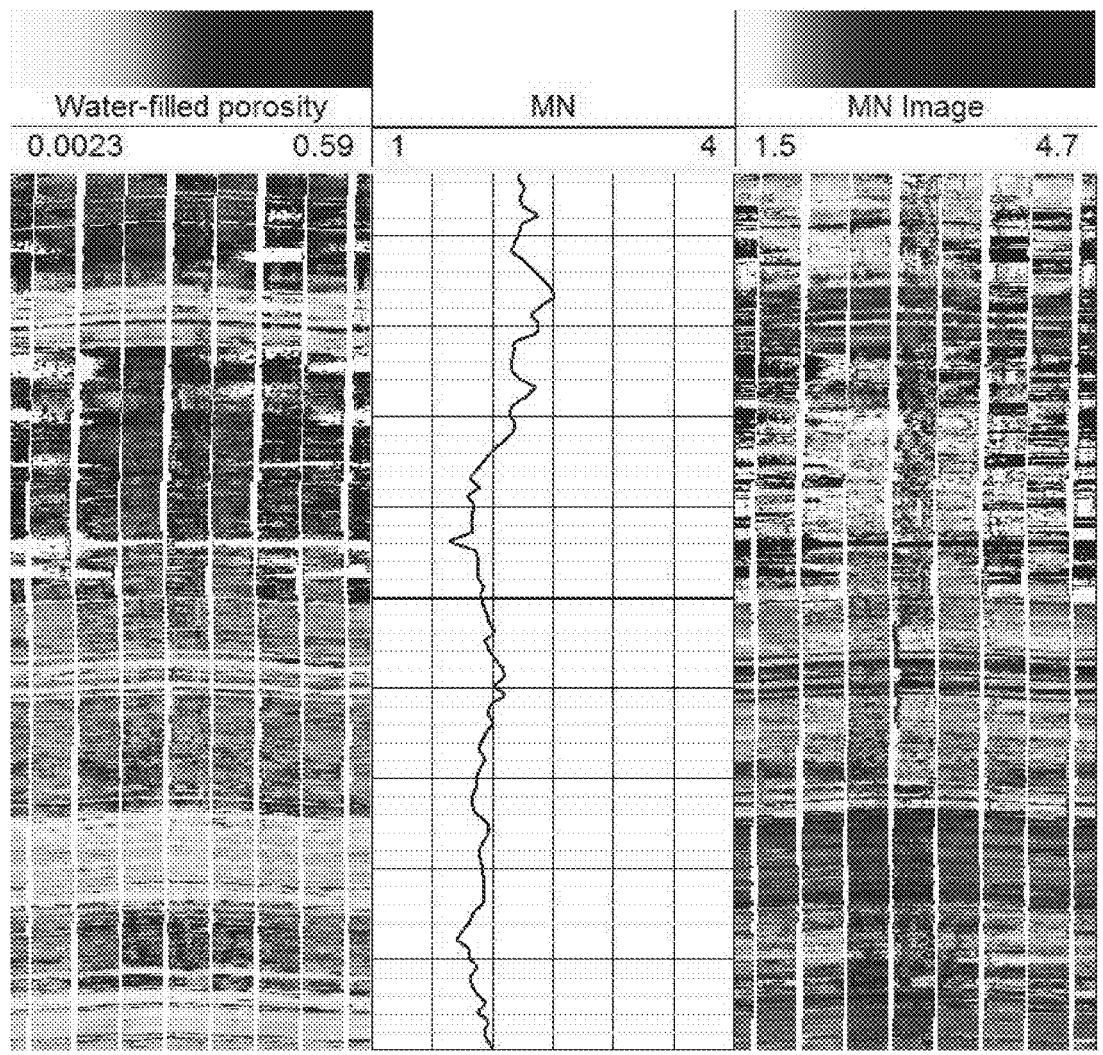
FIG. 13 shows petrophysical images that can be used for geomechanical analysis in accordance with one embodiment.

Further, the petrophysical images (or other petrophysical data) 126 derived from the calibrated HFI images can be used for geomechanical analysis. In some embodiments, for instance, an MN image generated based on HFI images is used for downhole rock strength geomechanical evaluation. An example of this may be better understood with reference to FIG. 13, which shows joint-interpreted MN and water-filled porosity images in accordance with one embodiment. In this example, a DS measurement tool inverted cementation factor MN shows similar values and the dynamic range as MN from HFI (see graph in FIG. 13). However, the MN image on the right in FIG. 13 indicates that the MN values have a more heterogeneous azimuthal distribution in the top part of the image while a more homogeneous azimuthal distribution in the bottom of the image. This can be related to rock strength and indicative of the rock on top starting to break and having breakouts forming while the rock at the bottom of the image is very stable. The joint-interpreted water-filled porosity image on the left in FIG. 13 also shows that the water saturation differs both azimuthally and from top to bottom of this section.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A method comprising:
acquiring formation data with a borehole imaging tool deployed in a well penetrating a formation, wherein the formation data are permittivity and conductivity images at least at a first predetermined frequency;
acquiring additional formation data with a dielectric logging tool deployed in the well, wherein the additional formation data are permittivity and conductivity values at each depth for multiple different frequencies (FD1, FD2, FD3, FD4), each being distinct for the at least first predetermined frequency;
calibrating the formation data acquired with the borehole imaging tool based on the additional formation data acquired with the dielectric logging tool; and
determining a petrophysical parameter of the formation based on the calibrated formation data.

2. The method of claim 1, wherein calibrating the formation data acquired with the borehole imaging tool based on the additional formation data acquired with the dielectric logging tool includes obtaining dispersion curves of each of the formation conductivity and permittivity by fitting a dispersion model respectively to the permittivity and conductivity values acquired at multiple different frequencies (FD1, FD2, FD3, FD4) via the dielectric logging tool at each depth level and retrieving permittivity and conductivity values at least at the predetermined frequency used by the borehole imaging tool based on the dispersion curves.

3. The method of claim 1, wherein acquiring formation data with the borehole imaging tool includes detecting electromagnetic signals at a first set of frequencies from the formation with the borehole imaging tool and generating at least one image based on the electromagnetic signals detected by the borehole imaging tool, and wherein acquiring additional formation data with the dielectric logging tool includes detecting electromagnetic signals at a second set of frequencies, different than the first set of frequencies, from the formation with the dielectric logging tool and determining at least one formation parameter based on the electromagnetic signals detected by the dielectric logging tool.

4. The method of claim 1, comprising generating a measurement confidence index for the dielectric logging tool based on parameters derived from measurements acquired via the borehole imaging tool.

5. The method of claim 1, wherein acquiring the formation data with the borehole imaging tool and acquiring the additional formation data with the dielectric logging tool includes acquiring both the formation data and the additional formation data via a logging run with a tool string including both the borehole imaging tool and the dielectric logging tool.

6. The method of claim 1, wherein calibrating the formation data acquired with the borehole imaging tool based on the additional formation data acquired with the dielectric logging tool includes calibrating the conductivity and permittivity images of the formation data with the conductivity and permittivity measurements of the additional formation data.

7. The method of claim 6, wherein calibrating the formation data acquired with the borehole imaging tool based on the additional formation data acquired with the dielectric logging tool includes matching resolution and depth between the conductivity and permittivity images of the formation data acquired with the borehole imaging tool and the conductivity and permittivity measurements of the additional formation data.

8. The method of claim 6, wherein determining the petrophysical parameter of the formation based on the calibrated formation data includes generating an image of water-filled porosity of the formation based on the calibrated conductivity and permittivity images.

9. The method of claim 6, wherein determining the petrophysical parameter of the formation based on the calibrated formation data includes generating an image of water-phase tortuosity of the formation based on the calibrated conductivity and permittivity images.

10. The method of claim 6, wherein determining the petrophysical parameter of the formation based on the calibrated formation data includes generating an image of resistivity of a flushed zone in the formation based on the calibrated conductivity and permittivity images.

11. A method comprising:
acquiring data pertaining to a formation surrounding a borehole, wherein acquiring the data pertaining to the formation includes acquiring electrical measurements of the formation obtained with a borehole imaging tool and acquiring dispersion data for the formation;
generating images of electrical parameters of the formation based on the electrical measurements obtained with the borehole imaging tool, wherein the images of electrical parameters are permittivity and conductivity images at least at a first predetermined frequency;
calibrating the generated images of electrical parameters of the formation based on the acquired dispersion data for the formation through laboratory core-sample analysis; and
creating a petrophysical image of the formation surrounding the borehole based on the calibrated images of electrical parameters of the formation.

12. The method of claim 11, comprising performing a logging run with the borehole imaging tool to obtain the electrical measurements of the formation.

13. An apparatus comprising:
a downhole tool string that facilitates data acquisition within a borehole, the downhole tool string including a borehole imaging tool and a multi-frequency dielectric logging tool; and
wherein the borehole imaging tool is configured to acquire permittivity and conductivity images at least at a first predetermined frequency,
wherein the multi-frequency dielectric logging tool is configured to acquire permittivity and conductivity values at each depth for multiple different frequencies (FD1, FD2, FD3, FD4), each being distinct for the at least first predetermined frequency; and
an analysis system configured to receive measurements acquired via the borehole imaging tool and the multi-frequency dielectric logging tool, and to calibrate received measurements acquired via the borehole imaging tool based on received measurements acquired with the multi-frequency dielectric logging tool.

14. The apparatus of claim 13, wherein the analysis system is configured to use the calibrated measurements of the borehole imaging tool to generate calibrated petrophysical images of a wall surrounding the borehole.

15. The apparatus of claim 13, wherein the borehole imaging tool includes a high-frequency imager.

16. The apparatus of claim 13, wherein the borehole imaging tool and the multi-frequency dielectric logging tool are embodied as separate tools each incorporated as part of the downhole tool string.

17. The apparatus of claim 13, wherein the downhole tool string is a wireline tool string.

* * * * *